United States Patent [19]
Fairbanks

[11] Patent Number: 5,853,511
[45] Date of Patent: Dec. 29, 1998

[54] METHOD FOR JOINT REINFORCEMENT OF DISSIMILAR MATERIALS

[76] Inventor: Robert P. Fairbanks, 6038 Tridale Ct., Cincinnati, Ohio 45230

[21] Appl. No.: 645,135

[22] Filed: May 13, 1996

Related U.S. Application Data

[63] Continuation of Ser. No. 235,604, Apr. 29, 1994, abandoned.
[51] Int. Cl.$^6$ ..................................................... B32B 31/12
[52] U.S. Cl. ........................... 156/71; 156/295; 156/299; 156/304.3
[58] Field of Search .............................. 156/71, 291, 295, 156/297, 299, 304.1, 304.3, 304.4, 314, 315; 144/346, 348; 428/57, 58, 61, 189; 52/391, 746.12

[56] References Cited

U.S. PATENT DOCUMENTS

| | | | |
|---|---|---|---|
| 1,752,402 | 4/1930 | Tomec et al. | 156/298 |
| 2,412,693 | 12/1946 | Prerson | 156/304.3 X |
| 2,516,280 | 7/1950 | Welch | 156/304.1 X |
| 2,726,222 | 12/1955 | Palmquist et al. . | |
| 3,094,747 | 6/1963 | Hess . | |
| 3,267,881 | 8/1966 | Saggione . | |
| 3,521,418 | 7/1970 | Bartoloni | 156/297 |
| 3,991,243 | 11/1976 | Biddell . | |
| 4,113,910 | 9/1978 | Loyd . | |
| 4,156,054 | 5/1979 | Gurewitsch . | |
| 4,215,516 | 8/1980 | Huschle et al. . | |
| 4,235,952 | 11/1980 | Holmes et al. . | |
| 5,104,475 | 4/1992 | Foster, et al. | 156/304.4 X |

FOREIGN PATENT DOCUMENTS

| | | | |
|---|---|---|---|
| 104692 | 7/1899 | Germany | 156/304.3 |
| 2149344 | 6/1985 | United Kingdom | 156/304.3 |

OTHER PUBLICATIONS

Fine Homebuilding: Questions & Answers about Building, pp. 166–168, 1989.

*Primary Examiner*—Steven D. Maki
*Attorney, Agent, or Firm*—Mayer, Brown & Platt

[57] ABSTRACT

A method for joint reinforcement of dissimilar materials and products made by such method. The method includes the steps of spray coating a contact adhesive on the contact area between a substrate and covering material sheets, providing a reinforcement interleave of fibrous glass between the joint area of covering material sheets and the substrate, and applying a second adhesive on the reinforcement interleave such that the second adhesive is extruded through the seam when the covering material sheets are applied to the substrate.

10 Claims, 3 Drawing Sheets

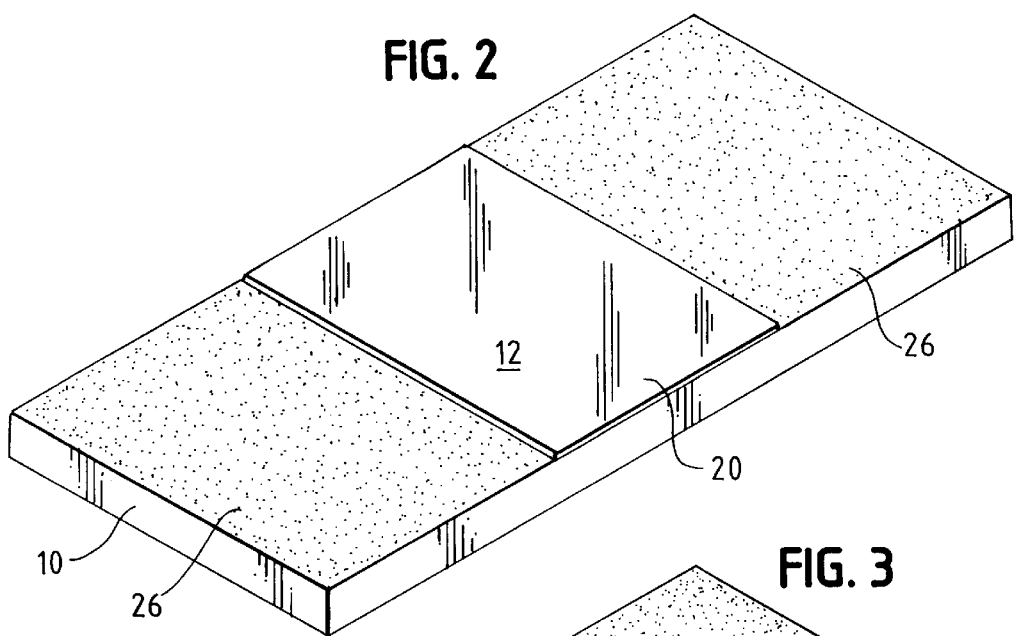
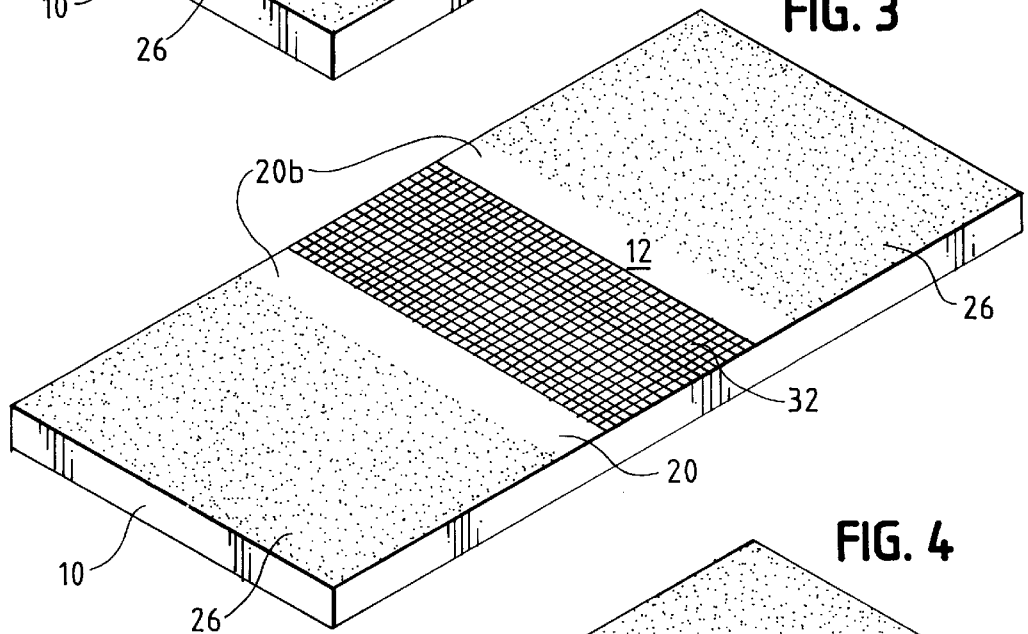
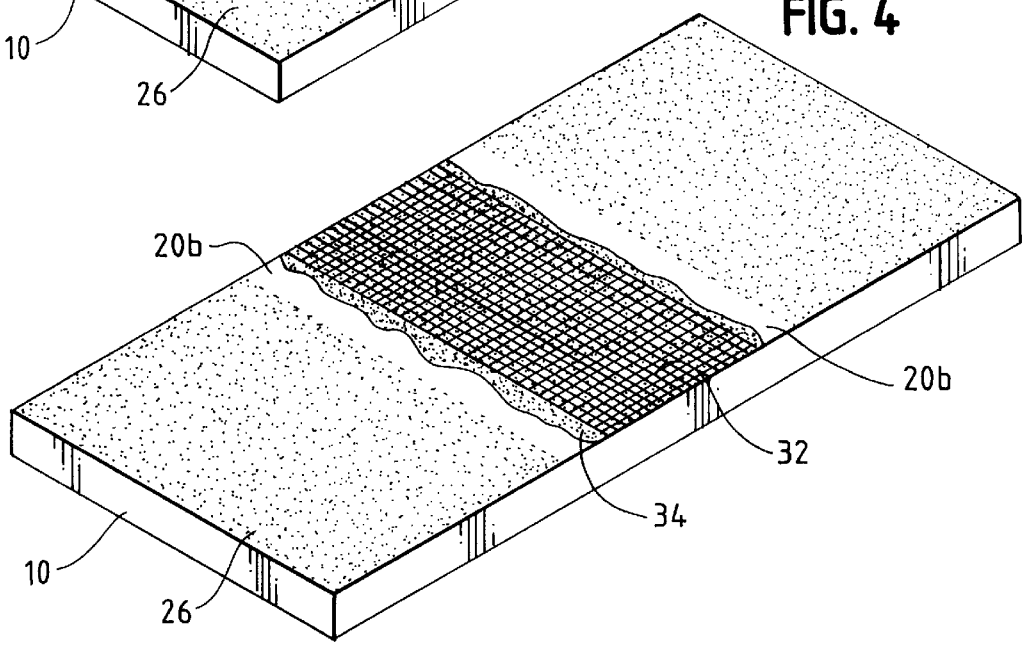

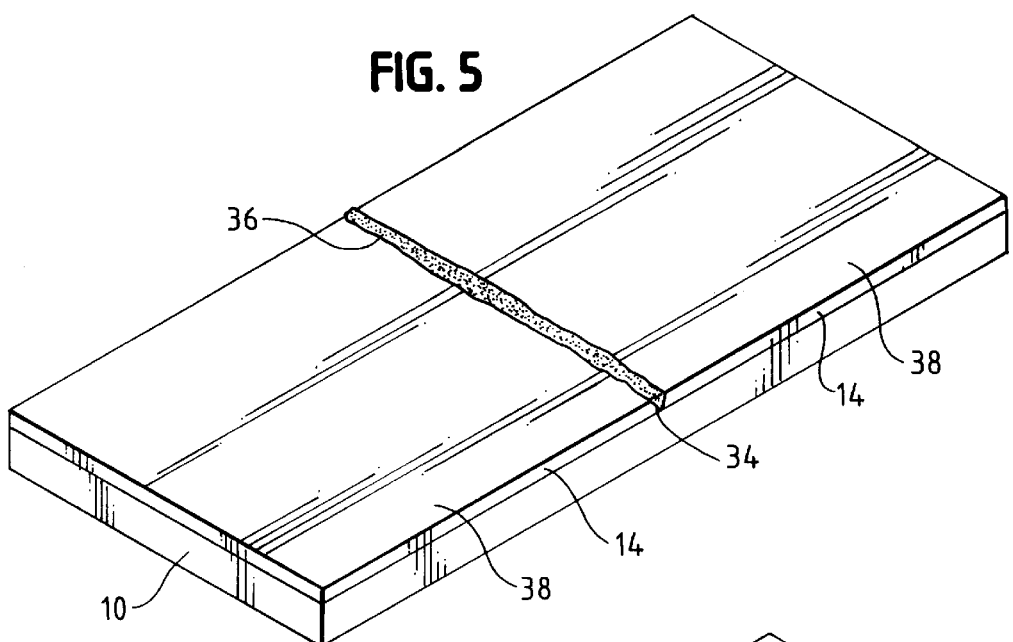
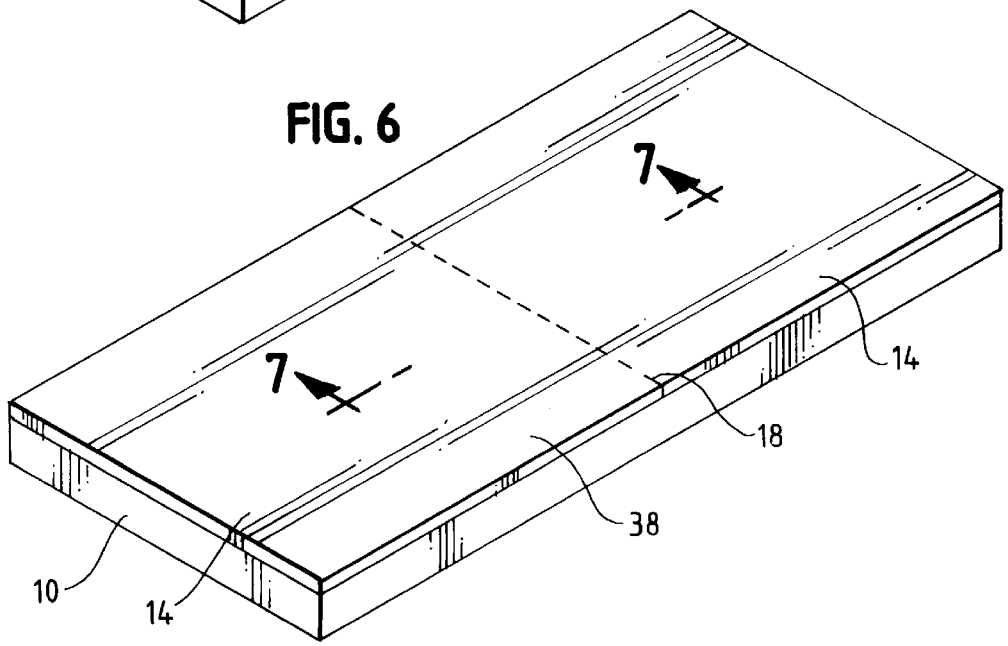
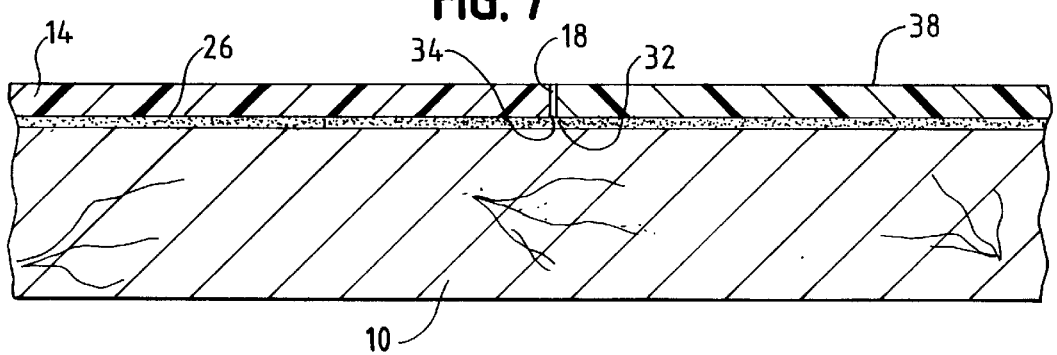

METHOD FOR JOINT REINFORCEMENT OF DISSIMILAR MATERIALS

This is a continuation of application Ser. No. 08/235,604 filed on Apr. 29, 1994, now abandoned.

FIELD OF THE INVENTION

The present invention relates to a method for joint reinforcement of dissimilar materials, and more particularly to a method for connecting thermoplastic covering material sheets to a substrate of differing material to prevent separation of the sheet material from the substrate along a seam formed between adjacent sheets.

BACKGROUND OF THE INVENTION

Plastic laminate surfaces are found in almost every home, particularly in the kitchens and bathrooms of these homes. Generally recognizable forms of plastic laminate surfaces primarily include countertops and tabletops. These plastic laminate surfaces are generally formed by applying a sheet of decorative plastic laminate material to a supporting substrate with adhesives. Because the plastic laminate is generally provided in sheets of specific dimensions, the sheets are often cut to fit a particular application and then joined together on the substrate to provide a protective and decorative finish.

The cutting and sizing of plastic laminate sheets and their application to a substrate is generally performed on site providing a durable and relatively inexpensive work surface. However, when the plastic laminate is cut to fit a particular substrate, conspicuous seams between adjoining sheets may result which some believe to be aesthetically unpleasant. Moreover, with respect to durability, the environments where these work surfaces are generally utilized, namely bathrooms and kitchens, generally include the elements of heat and moisture which contribute significantly to the deterioration of the seam joint and may cause separation between the plastic laminate and the substrate or between adjoining sheets. For example, substrates used in kitchen or bathroom work surface application are generally comprised of wood or other cellulosic material. These materials will swell when exposed to moisture thereby inducing a force or pressure on the seam between the sheets of plastic laminate. In addition, the plastic laminate and the substrate generally have different coefficients of thermal expansion, thus, heat may also cause a separation between the laminate and the substrate along the seam.

Positioning a seaming adhesive into the seam or joint between covering material sheet requires the adhesives to carry loads induced on the seam joint by expansion and contraction of the cellulosic substrate. These stresses can cause the seams to crack and fail. Once separation occurs, it is extremely difficult to return the work surface to its original condition.

It is therefore desirable to achieve a visually inconspicuous seam when joining two sheets of plastic or coating material which does not fail under environmental conditions. To facilitate a visually inconspicuous seam, the seaming adhesive must be color matched to the plastic sheet or coating material. It is also important that adhesive selection takes into account color stability over the life span of the installation.

Thus, it is an object of the present invention to provide a method of joining thermoplastic material sheets to a substrate in such a manner that seams formed between the sheets of plastic do not readily separate.

Another object of the present invention is to provide a method of joining thermoplastic sheets to a substrate wherein the seam between adjoining sheets is not readily discernable.

Yet another object of the present invention is to provide a work surface utilizing a plastic covering material which is securely fastened to a substrate.

Other objects and advantages of the present invention will become apparent upon reading the following detailed description and appended claims and upon reference to the accompanying drawings.

SUMMARY OF THE INVENTION

In the present invention, the aforementioned problems are solved by utilizing a method for joining two dissimilar materials together to form a work surface. The method includes the steps of providing a substrate having a top surface and a plurality of decorative thermoplastic material sheets. Thereafter, a first adhesive is applied to the top surface of the substrate and the underlying surface of the material sheets. Next, a fibrous interleave is disposed on the substrate at a point where two sheets of plastic will abut together and form a seam. Next, a second adhesive is applied to the fibrous interleave and the sheets of plastic are placed on the substrate with abutting edges extending along the fibrous interleave such that the second adhesive is extruded through the seam. After the second adhesive has cured, excess adhesive extruded through the seam is machined away. For a more complete understanding of the present invention, reference should now made to the embodiment illustrated in greater detail in the accompanying drawings and described below by way of example of the invention.

IN THE DRAWINGS

FIG. 2 is an isometric view illustrating the coating of a portion of the substrate;

FIG. 3 illustrates the addition of a fibrous glass resin to the substrate of FIG. 2;

FIG. 4 illustrates the addition of a second adhesive to the fibrous glass resin of FIG. 3;

FIG. 5 illustrates the placement of the thermoplastic material sheets on the prepared substrate of FIG. 4;

FIG. 6 illustrates a work surface made according to the method of the present invention;

FIG. 7 is a cross-sectional view of the work surface of FIG. 6 taken along line 6—6.

DETAILED DESCRIPTION

Figure 1:
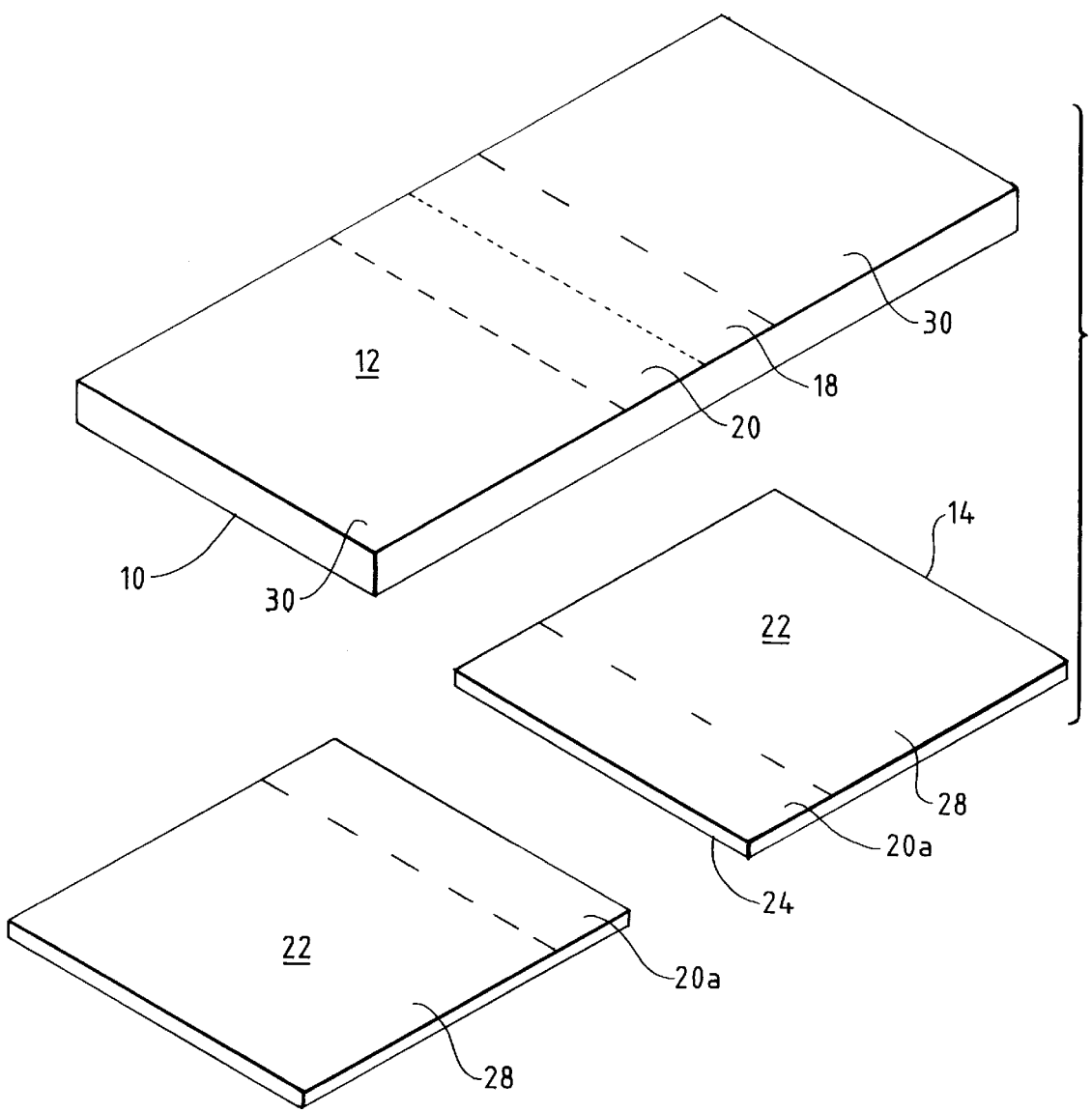
FIG. 1 is an isometric view of a substrate and thermoplastic material sheet illustrating the provision of starting material for joining two dissimilar materials according to the present invention.

Referring now to the drawings in detail, FIGS. 1 through 6 illustrate a series of steps for joining two dissimilar materials according to the present invention. As an example of the application of the present invention, the formation of a work surface such as a kitchen countertop will be discussed using the present invention.

FIG. 1 illustrates a substrate 10 used to create a work surface. The substrate 10 is generally a cellulosic material such as plywood, industrial particle board or medium density fiberboard (mdf) cut to the desired dimensions for forming the work surface and generally includes a smooth planar surface 12. It is preferred that a plywood composed of thin wood veneers (with grains placed at right angles) bonded with a synthetic resin, usually phenol-formaldehyde or resorcinol-formaldehyde be utilized as it generally has the lowest water absorption properties of the recommended cellulose based substrates.

FIG. 1 also illustrates a covering material to be secured to the substrate to form the durable yet aesthetically pleasing outer layer of the work surface or countertop. The covering material is generally a thermoplastic material that is provided in sheets 14 of a selected size which are cut on site to be bonded to the top surface 12 of the substrate 10. Preferably, the thermoplastic material is Valox® alloyed thermoplastic extruded sheets manufactured by GE Plastics and marketed under the name Nuvel® by Formica Corporation.

The size of the substrate 10 is selected for the desired application, such as a kitchen countertop. The size of the thermoplastic sheets 14 are of predetermined dimensions, generally 30 inch, 48 inch and 60 inch sheets of various lengths. Points where material sheets 14 will need to be cut to fit smoothly on the substrate 10 and the position of any seams 18 (lines where cut portions of the thermoplastic sheets will be aligned in end to end abutment) are easily determined and marked as such as illustrated in FIG. 1.

The substrate 10 should be masked on the joint area 20 on the top surface 12 of the substrate 10 where two sheets 14 of covering material will abut and form a seam 18. Masking may be accomplished with commonly available self-adhesive tape which forms a barrier over the area desired to be masked and which may be easily and quickly removed without damaging the masked area. Additionally, the joint area 20A of the underside 22 of the plastic sheets which are to be placed on the substrate in end to end abutment forming a seam therebetween should also be masked. Preferably, the underside 22 of the plastic sheets should be masked from the edge 24 to a point approximately one to two inches inward therefrom. Masking prevents contamination and co-mingling between two different adhesives used to secure the plastic laminate sheets 14 to the substrate 10. It should be understood that the material sheets are illustrated in FIG. 1 with their underside 22 facing up to show the joint area 20A.

FIG. 2 illustrates the application of a contact adhesive 26 to the unmasked portions 30 of the substrate. The unmasked portion 28 of the underside 22 of the plastic sheets should also be spray coated with the contact adhesive (not illustrated). It is preferred that a neoprene elastomer based contact adhesive be utilized and that it be applied by spray coating. Time should be given to allow the volatile carriers in the adhesive 26 to evaporate after which the masking material may be removed.

FIG. 3 illustrates the application of a woven fiber cloth, scrim or mat 32 to a portion of the remainder or joint area 20 on the substrate. (The joint area or remainder is the area on the substrate without the neoprene elastomer based contact adhesive). The cloth or scrim 32 should be centered on the joint area 20 traversing the entire length and be dimensioned to provide for an approximately one-half inch area 20B void of neoprene elastomer based contact adhesive on either side thereof. The one-half inch area 20B provides a buffer to prevent bleeding of the contact adhesive 26 into the second adhesive 34 discussed below. The cloth or scrim 32, generally referred to as a reinforcement interleave, generally comprises fibrous glass, graphite, or kevlar. It is preferred that fibrous glass, such as E-glass (borosilicate glass) or high tensile strength S-Glass (magnesia-alumina-silicate) be utilized.

The reinforcement material 32 may be woven into a fabric or constructed into a cloth scrim (a low cost non-woven open weave reinforcing fabric made from continuous filament yarn in an open mesh construction), or be used as unidirectional fibers, or random chopped or strands of fiber formed into a mat(a fibrous material for reinforcing plastic consisting of randomly oriented chopped filament or swirled filaments with a binder, and available in blankets of various widths, weights and lengths). For maximum reinforcement and strength, a higher volume of fibers should be orientated perpendicular to the seam direction.

After placement of the reinforcement interleave 32, a second adhesive 34 is applied to the reinforcement interleave 32. Saturation and impregnation of the fibers of the interleave 32 is assured by manually spreading the adhesive 34 over the reinforcement interleave with a spatula or the like. The second adhesive 34 is preferably methyl methacrylate. This adhesive is preferred due to color stability, color matchability, bonding properties to plastic sheet and wood products, short cure times and ease of fabrication. It should be noted that the unreinforced resin is brittle with low tensile strength and low strain to failure. However, when chopped or milled fibrous reinforcement material is added to the neat resin other desirable properties such as, ease of fabrication, thixotropy, and color matchability diminish. The scrim 32 therefore provides the reinforcement necessary to assist the adhesive 34 in carrying the aforementioned forces while maintaining the desired properties of the methyl methacrylate. The methyl methacrylate is color matched with the thermoplastic material sheets 14 to assist in accomplishing the desired object of providing inconspicuous seams when joining two sheets of plastic sheets. The methyl methacrylate may also be used around edge banding and sink installations FIG. 5 illustrates the application of the thermoplastic sheets 14 to the substrate 10 with the underside 22 contacting the top surface 12. Pressure should be applied to the seam area 18, preferably by roller, to remove any excess adhesive from between the underside 22 and the surface 12. The second sheet 14 of thermoplastic material is applied to the substrate 12 and positioned adjacent the first sheet to insure a tight joint at the seam 18. Again, pressure is applied to the joint area 20 and 20A, and as illustrated in FIG. 5 excess adhesive 34 is extruded through the seam 18 forming a bead 36. Sufficient amounts of adhesive 34 should be applied to the joint area 20 to ensure extrusion of adhesive 34 through the entire length of the seam 18.

Once the adhesive 34 has cured, the bead 36 is machined, such as by sanding, to provide a smooth continuous decorative surface 38 with a generally inconspicuous seam as illustrated in FIG. 6 (the dashed line in FIG. 6 is included to indicate the location of the seam). The method of joining the thermoplastic sheets 14 and substrate 10 may be performed on site, such as in a residential kitchen or bathroom where the work surface or countertop is to be installed. Additionally, it may be performed in a factory or other industrial setting where the dimensions of the work surface to be formed are known. FIG. 7 illustrates the cross-sectional area of the work surface of FIG. 6 formed according to the present invention.

One advantage of using methyl methacrylate reinforced with the fibrous glass scrim is that the seaming adhesive carry loads induced on the seam joint by expansion and contraction of the cellulosic substrate caused by moisture absorption or abstraction from changes in relative humidity thereby preventing degradation of the seam joint.

Although the present invention of a method of joining two dissimilar materials has been described by way of example as for forming a countertop or work surface, many other variation and modifications will now become apparent to those skilled in the art. It is preferred, therefor, that the present invention be limited not by the specific disclosure herein, but only by the appended claims.

What is claimed is:

1. A method for joint reinforcement of dissimilar material comprising the steps of:

providing a substrate material having a substantially planar surface;

providing a plurality of covering material sheets having a top surface and an underside, said plurality of material sheets comprised of a material different from said substrate material;

applying a first adhesive to a portion of said planar surface of said substrate;

disposing a reinforcement interleave having a top surface and an underside on the remainder portion of said planar surface;

disposing a second adhesive different from said first adhesive on the top surface of said reinforcement interleave;

placing said material sheets on said planar surface such that a seam is formed therebetween adjacent said reinforcement interleave, the seam defining a length between the top surface and underside of the material sheets;

extruding said second adhesive through the entire length of said seam; and maintaining said first adhesive separate from said second adhesive when applying said first adhesive and disposing said second adhesive and during said extruding step.

2. The method of claim 1 wherein said step of applying a first adhesive includes preliminarily masking the remainder portion of said planar surface of said substrate.

3. The method of claim 1 further including the step of machining off said second adhesive material extruded through said seam such that its uppermost extent is coplanar with said plurality of material sheets.

4. The method of claim 3 wherein said step of machining includes sanding.

5. The method of claim 1 wherein said step of disposing a second adhesive different from said first adhesive on the top surface of said reinforcement interleave includes manually spreading said second adhesive on said reinforcement interleave.

6. The method of claim 1 wherein said step of placing said material sheets includes positioning a first material sheet on said substrate, applying contact pressure with a roller along an edge to be abutted with a second material sheet, positioning said second material sheet on said substrate in abutment with said first sheet forming a seam joint and applying contact pressure with a roller along said seam joint to assure that excess second adhesive is extruded through seam joint.

7. The method of claim 1 wherein the step of applying a first adhesive includes spray coating.

8. The method of claim 1 wherein the step of applying a first adhesive includes applying said first adhesive to a portion of said planar surface of said substrate and a corresponding similar portion of the underside of said material sheets.

9. A method for joint reinforcement of dissimilar material comprising the steps of:

providing a substrate material having a substantially planar surface;

providing a plurality of covering material sheets having a top surface and an underside, said plurality of material sheets comprised of material different from said substrate material and having a predetermined color;

applying a first adhesive to a portion of said planar surface of said substrate;

disposing a reinforcement interleave having a top surface and an underside on the remainder portion of said planar surface;

disposing a second adhesive different from said first adhesive, on the top surface of said reinforcement interleave, said second adhesive having a color matching said covering material sheets;

placing said material sheets on said planar surface such that a seam is formed therebetween adjacent said reinforcement interleave, the seam defining a length between the top surface and underside of the material sheets;

extruding said second adhesive through the entire length of said seam; and maintaining said first adhesive separate from said second adhesive when applying said first adhesive and disposing said second adhesive and during said extruding step.

10. A method for joint reinforcement of dissimilar material comprising the steps of:

providing a substrate material having a substantially planar surface;

providing a plurality of covering material sheets having a top surface and an underside, said plurality of material sheets comprised of material different from said substrate material and having a predetermined color;

applying a first adhesive to a portion of said planar surface of said substrate;

disposing a reinforcement interleave having a top surface and an underside on the remainder portion of said planar surface;

applying a second adhesive different from said first adhesive on the top surface of said reinforcement interleave, said second adhesive having a color matching said covering material sheets;

placing said material sheets on said planar surface such that a seam is formed therebetween adjacent said reinforcement interleave, the seam defining a length between the top surface and underside of the material sheets;

extruding said second adhesive through the entire length of said seam and forming a bead comprised of said second adhesive along the entire length of said seam; and maintaining said first adhesive separate from said second adhesive when applying said first adhesive and applying said second adhesive and during said extruding step.

* * * * *